United States Patent
Takada et al.

(10) Patent No.: US 10,218,864 B2
(45) Date of Patent: Feb. 26, 2019

(54) IMAGE FORMING DEVICE AND IMAGE FORMING SYSTEM

(71) Applicant: KONICA MINOLTA, INC., Chiyoda-ku, Tokyo (JP)

(72) Inventors: Hiroaki Takada, Mitaka (JP); Ryo Oshima, Kokubunji (JP); Daisuke Kawate, Hachioji (JP); Yoshiaki Kondoh, Hachioji (JP); Shougo Kamiya, Otsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/825,971

(22) Filed: Nov. 29, 2017

(65) Prior Publication Data

US 2018/0152574 A1    May 31, 2018

(30) Foreign Application Priority Data

Nov. 30, 2016    (JP) .................................. 2016-231982

(51) Int. Cl.
*H04N 1/00*    (2006.01)
*B65H 7/14*    (2006.01)
(Continued)

(52) U.S. Cl.
CPC .......... *H04N 1/00663* (2013.01); *B65H 1/04* (2013.01); *B65H 1/26* (2013.01); *B65H 1/266* (2013.01);
(Continued)

(58) Field of Classification Search
CPC .......... H04N 1/00663; H04N 1/00588; H04N 1/0062; H04N 2201/0094; B65H 1/26;
(Continued)

(56) References Cited

U.S. PATENT DOCUMENTS

| 4,696,615 A | * | 9/1987 | Ettischer | B65B 69/0033 271/157 |
| 2001/0011795 A1 | * | 8/2001 | Ohtsuka | B65H 1/266 271/145 |

(Continued)

FOREIGN PATENT DOCUMENTS

| JP | 02243424 A | 9/1990 |
| JP | 09301551 A | 11/1997 |
| JP | 2006137453 A | 6/2006 |

*Primary Examiner* — Allen H Nguyen
(74) *Attorney, Agent, or Firm* — Cantor Colburn LLP

(57) ABSTRACT

Provided is an image forming device in which a wrapped body that is a paper bundle wrapped in wrapping paper is set into a paper housing, the wrapping paper is subsequently removed and the paper bundle is exposed, and paper is conveyed by one sheet in image forming, the image forming device including: a reader that reads an image on the wrapping paper; and a hardware processor that: compares the image on the wrapping paper, the image being read by the reader, and an image on each of various kinds of wrapping paper, the image being stored in a storage; reads, from the storage, paper setting associated to wrapping paper corresponding to the image on the wrapping paper, the image being read by the reader; and sets a conveyance condition and a process condition based on the paper setting.

9 Claims, 8 Drawing Sheets

(51) Int. Cl.
   *B65H 1/26* (2006.01)
   *B65H 1/04* (2006.01)
   *B65H 7/02* (2006.01)
   *B65H 7/20* (2006.01)

(52) U.S. Cl.
   CPC ............... *B65H 7/02* (2013.01); *B65H 7/14* (2013.01); *B65H 7/20* (2013.01); *H04N 1/0062* (2013.01); *H04N 1/00588* (2013.01); *B65H 2220/04* (2013.01); *B65H 2405/15* (2013.01); *B65H 2405/311* (2013.01); *B65H 2405/313* (2013.01); *B65H 2405/332* (2013.01); *B65H 2511/413* (2013.01); *B65H 2511/414* (2013.01); *B65H 2511/416* (2013.01); *B65H 2701/1829* (2013.01); *B65H 2801/06* (2013.01); *H04N 2201/0094* (2013.01)

(58) Field of Classification Search
   CPC . B65H 7/14; B65H 1/04; B65H 1/266; B65H 7/02; B65H 7/20; B65H 2220/04; B65H 2220/01; B65H 2220/03; B65H 2220/02; B65H 2405/15; B65H 2405/311; B65H 2405/313; B65H 2405/332; B65H 2511/413; B65H 2511/414; B65H 2511/416; B65H 2701/1829; B65H 2801/06
   USPC ....................................................... 358/1.12
   See application file for complete search history.

(56) References Cited

U.S. PATENT DOCUMENTS

| | | | |
|---|---|---|---|
| 2009/0128860 A1* | 5/2009 | Graushar | B41M 5/24 358/3.28 |
| 2013/0321865 A1* | 12/2013 | Hikichi | G06K 15/4065 358/1.15 |
| 2014/0185096 A1* | 7/2014 | Tokunaga | H04N 1/00976 358/1.15 |
| 2014/0312557 A1* | 10/2014 | Ishikawa | B65H 3/18 271/18.1 |
| 2017/0094096 A1* | 3/2017 | Taki | H04N 1/00827 |

* cited by examiner

IMAGE FORMING DEVICE AND IMAGE FORMING SYSTEM

CROSS-REFERENCE TO RELATED APPLICATIONS

The present invention claims priority under 35 U.S.C. § 119 to Japanese patent application No. 2016-231982, filed on Nov. 30, 2016, and the entire disclosure of which is incorporated herein by reference.

BACKGROUND

Technological Field

The present invention relates to an image forming device and an image forming system.

Description of the Related Art

In a related art, an image forming device such as a printer, a copier, and a facsimile includes a paper feeding device that picks up and feeds paper by one sheet from a paper bundle in a laminated state. In restocking such a paper feeding device with paper, a user manually performs operation of opening wrapping paper, taking out a paper bundle from the inside, and housing the paper bundle.

However, it is cumbersome and troublesome to manually perform operation of opening wrapping paper and housing a paper bundle into a paper feeding device and the like each time the device is restocked with paper. Also, there is a possibility that a paper jam in paper feeding or deterioration in printing accuracy is generated due to generation of damage or defacement of paper, or deterioration in alignment of paper during housing.

Thus, an image forming device in which a wrapped body that is a paper bundle wrapped in wrapping paper is set to a paper housing, which subsequently removes the wrapping paper and exposes the paper bundle, and which conveys paper by one sheet in image forming has been known.

Incidentally, paper by various manufacturers is used, and quality and kinds of paper (such as thickness or basis weight) thereof are different from each other. In a related art, it is necessary to manually set, for each kind of paper, a conveyance condition and a process condition in image forming according to quality and a kind of paper thereof. In a case of automatic setting, it is necessary to determine a manufacturer of paper.

Thus, a technology of putting a bar code including information related to various physical and mechanical properties of paper onto the paper and wrapping paper and of reading the bar code with a detecting device is proposed (see, for example, JP 2-243424 A).

Also, a technology of writing a paper kind mark including information such as a kind of paper, a size of paper, and a process condition onto wrapping paper and checking the paper kind mark with a detecting device is proposed (see, for example, JP 9-301551 A).

Also, a technology of attaching or embedding a contact-less IC tag to wrapping paper, reading information that is related to paper and is stored in the contactless IC tag with a transmission/reception unit, and performing control is proposed (see, for example, JP 2006-137453 A).

However, in each of the above related arts, there is a problem that a cost is increased since it is necessary to provide a bar code, a contactless IC tag, or the like separately on wrapping paper. There is wrapping paper on which a bar code is previously provided. However, a bar code is not necessarily provided on all kinds of wrapping paper and it is not possible to deal with such a case. Also, even in a case of being previously provided, a bar code is not always provided in a certain place. Thus, it is necessary to set a paper bundle in accordance with a reading position of a bar code and trouble is increased.

SUMMARY

An object of the present invention is to provide an image forming device and an image forming system that can set a conveyance condition and a process condition suitable for paper without making a change on wrapping paper and regardless of a set direction of a paper bundle.

To achieve the abovementioned object, according to an aspect of the present invention, there is provided an image forming device in which a wrapped body that is a paper bundle wrapped in wrapping paper is set into a paper housing, the wrapping paper is subsequently removed and the paper bundle is exposed, and paper is conveyed by one sheet in image forming, and the image forming device reflecting one aspect of the present invention comprises:

a reader that reads an image on the wrapping paper; and a hardware processor that: compares the image on the wrapping paper, the image being read by the reader, and an image on each of various kinds of wrapping paper, the image being stored in a storage; reads, from the storage, paper setting associated to wrapping paper corresponding to the image on the wrapping paper, the image being read by the reader; and sets a conveyance condition and a process condition based on the paper setting.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

[Outline of Image Forming Device]

Figure 1:
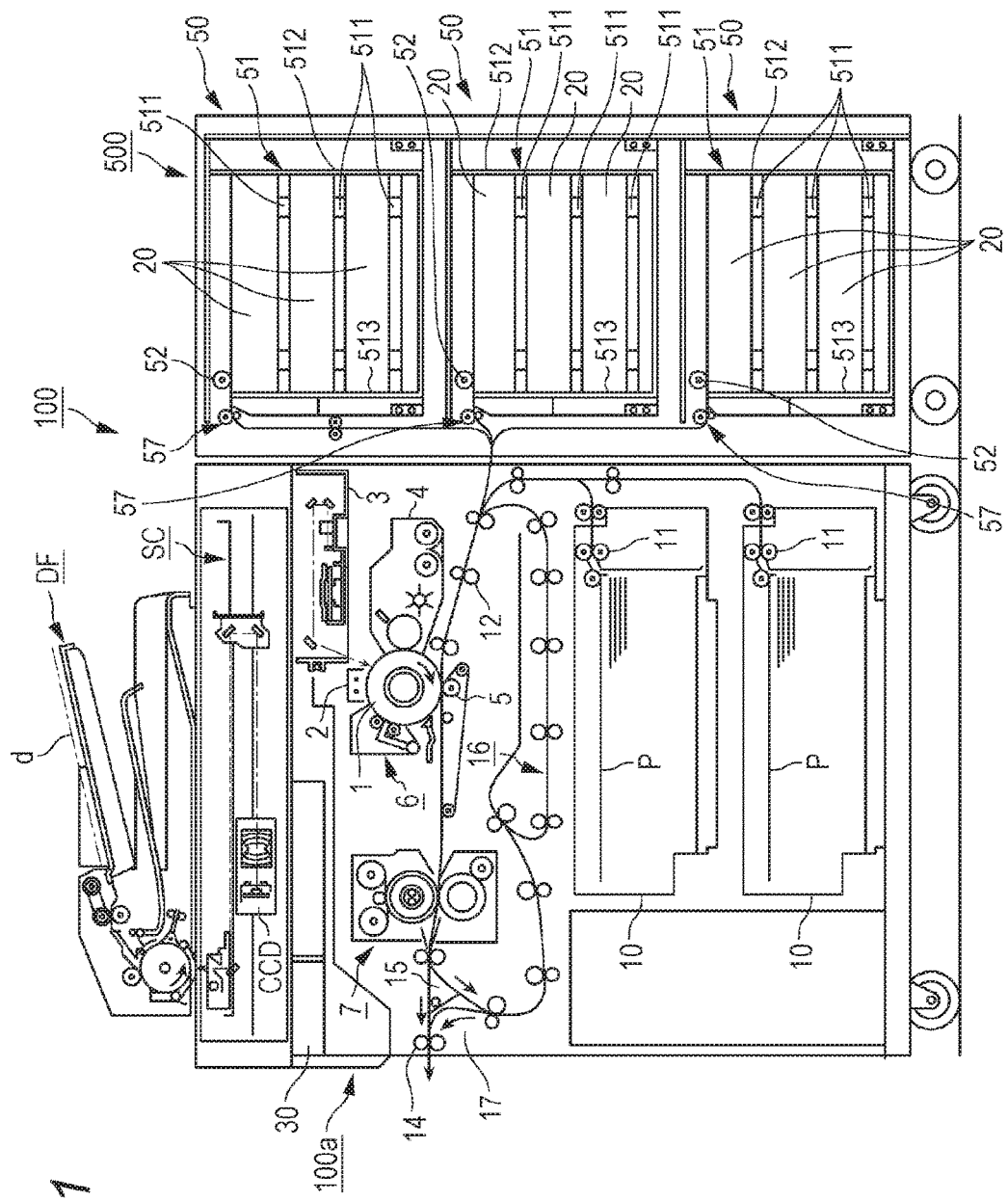
FIG. 1 is a front view illustrating a schematic configuration of an image forming device according to the present embodiment.
Figure 2:
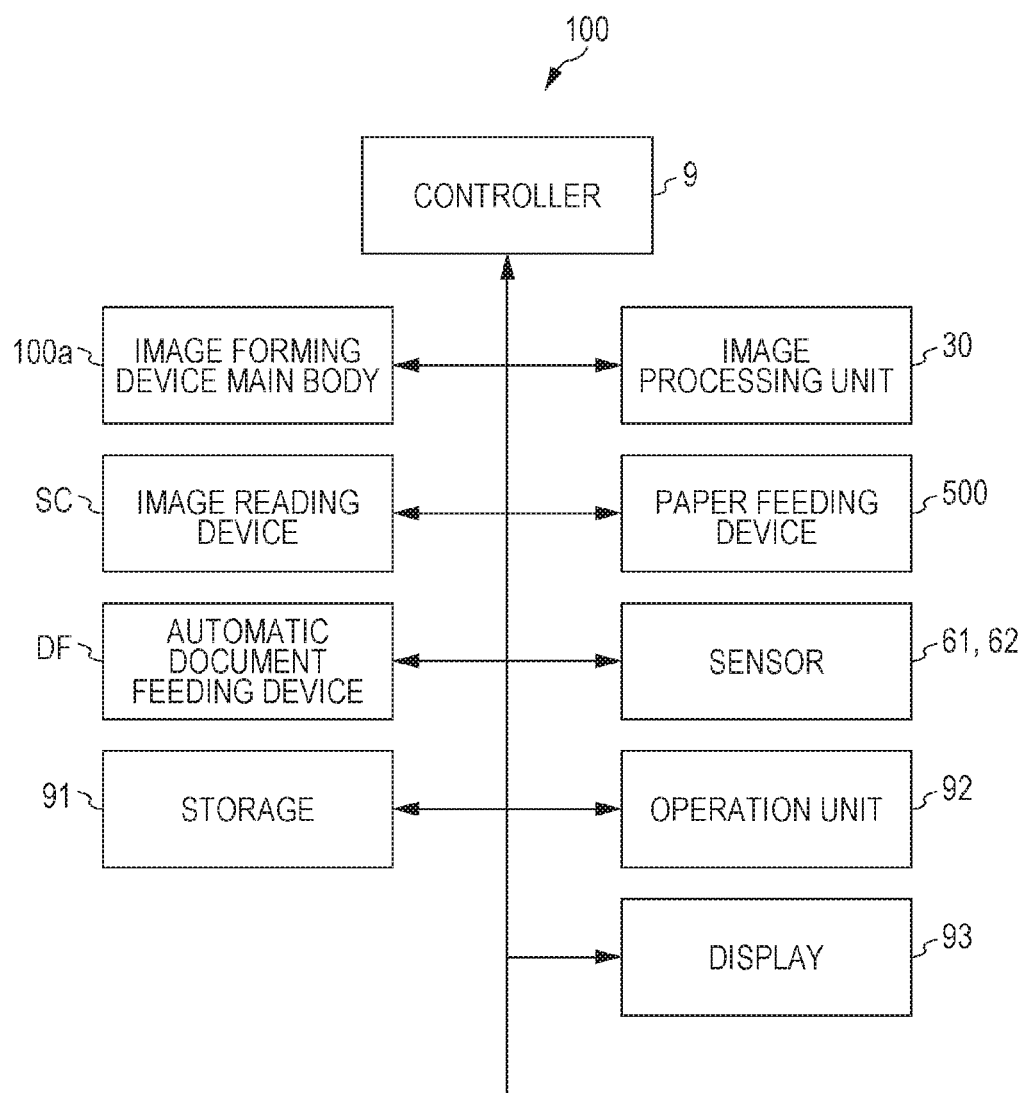
FIG. 2 is a functional block diagram illustrating a control structure of the image forming device according to the present embodiment.

As illustrated in FIGS. 1 and 2, an image forming device 100 according to the present embodiment mainly includes an image forming device main body 100*a*, an image reading device SC, an automatic document feeding device DF, an image processing unit 30, a paper feeding device 500, sensors 61 and 62, a controller 9, a storage 91, an operation unit 92, and a display 93.

The paper feeding device 500 includes three paper feeding units 50 provided in vertical alignment.

The image forming device main body 100*a* includes an image forming unit including a photoreceptor 1, a charging unit 2, an image exposure unit 3, a developing unit 4, a transfer unit 5, a cleaning unit 6, and the like, a fixing unit 7, and a paper conveyance system.

The paper conveyance system includes a paper feeding cassette 10, a first paper feeding unit 11, a second paper feeding unit 12, a paper ejecting unit 14, a conveyance path switching unit 15, a circular paper-refeeding unit 16, and a reverse paper ejecting unit 17.

[Automatic Document Feeding Device and Image Reading Device]

A document d placed on a document table of the automatic document feeding device DF is conveyed by a paper feeding unit. An image on one side or both sides of the document d is read by an optical system of the image reading device SC and is read by an image sensor CCD. After analog processing, A/D conversion, shading correction, image compression processing, and the like are performed by the image processing unit 30 with respect to an analog signal photoelectrically converted by the image sensor CCD, an image signal is transmitted to the image exposure unit 3.

The controller 9 can communicate with an external device (such as personal computer) connected to a communication network via a communication unit (not illustrated) and may transmit an image signal, which is received from the external device, to the image exposure unit 3 via the image processing unit 30.

[Image Forming Unit]

In the image forming unit, a charge is first applied to the photoreceptor 1 by the charging unit 2, a latent image is formed by emission of laser light from the image exposure unit 3, and a latent image is developed by the developing unit 4 and becomes a toner image. Then, paper P housed in the paper feeding cassette 10 is conveyed from the first paper feeding unit 11. In synchronization with the toner image, the paper P is conveyed in the second paper feeding unit 12 including a resist roller. Subsequently, the toner image is transferred to the paper P in the transfer unit 5 and is fixed thereto in the fixing unit 7. Note that not only the paper P housed in the paper feeding cassette 10 but also paper P housed in the paper feeding device 500 are fed to the image forming device main body 100*a*, and the toner image is transferred and fixed thereto.

The paper P after the fixing is ejected by the paper ejecting unit 14 to the outside of the device. Remaining transfer toner on the photoreceptor 1 is removed by the cleaning unit 6. Note that in a case of duplex printing, paper P on a first surface of which an image is formed is sent to the circular paper-refeeding unit 16 and reversed by the conveyance path switching unit 15, and is ejected by the paper ejecting unit 14 to the outside of the device after an image is formed on a second surface thereof by the image forming unit. In a case of reverse paper ejection, paper P branching from a normal paper ejecting path is ejected by the paper ejecting unit 14 to the outside of the device after being switched back and a surface and a rear surface thereof being reversed in the reverse paper ejecting unit 17.

[Outline of Paper Feeding Device]

As described above, the paper feeding device 500 includes the three paper feeding units 50 provided in vertical alignment, configurations thereof being identical. Thus, one paper feeding unit 50 will be described here.

The paper feeding unit 50 includes a paper housing 51 that houses a wrapped body 20 that is a paper bundle 21 wrapped in wrapping paper 22 (see FIGS. 3A to 3F), a pickup roller 52 that picks up paper P arranged on an uppermost surface in a paper bundle 21, which is housed in the paper housing 51 and wrapping paper 22 around which is opened, and that sends the paper P to a downstream side in a paper conveyance direction, a conveyance unit 57 provided on the downstream side in the paper conveyance direction of the pickup roller 52, and the like.

The paper housing 51 includes a paper loading table 511 as a paper loading unit on which a plurality of sheets of paper P is placed horizontally in a laminated state, a rear end regulating member 512 provided on an upstream side in the paper conveyance direction of the paper loading table 511, a leading end regulating member 513 provided on the downstream side in the paper conveyance direction of the paper loading table 511, and the like.

The paper loading table 511 is supported in a vertically movable manner in the paper feeding unit 50. The rear end regulating member 512 and the leading end regulating member 513 are equipped in a fixed manner in the paper feeding unit 50. An upper end part of the leading end regulating member 513 is slightly lower than an upper end part of the rear end regulating member 512.

A plurality of (three in example illustrated in FIG. 1) wrapped bodies 20, each of which is a paper bundle 21 wrapped in wrapping paper 22, is housed in the paper housing 51 and is respectively supported by a plurality of paper loading tables 511. The paper loading tables 511 respectively support the wrapped bodies 20 in such a manner that a gap is formed between the wrapped bodies 20 adjacent to each other in a vertical direction. Also, elevating movement is assigned to each of the paper loading tables 511 by control of an actuator (not illustrated) by the controller 9, control being performed in such a manner that a height of an uppermost part of a wrapped body 20 laminated on the paper loading table 511 is kept slightly lower than an upper end part of the leading end regulating member 513. In a case where all sheets of paper P of the wrapped body 20 are fed and the wrapped body 20 becomes empty, the paper loading table 511 is elevated in such a manner that a height of a next wrapped body 20 arranged on a lower side of the empty wrapped body 20 becomes a prescribed height. Also, in a case where paper is not fed, for example, in refilling of paper P, the paper loading table 511 can be lowered. Note that this height control with the actuator is performed on the basis of sensing by a sensor (not illustrated) that is provided on a side of the rear end regulating member 512 and that detects a height of a wrapped body 20 of an uppermost part.

The pickup roller 52 is arranged at a position abutted to paper P arranged on an uppermost surface of a paper bundle 21 and can be retracted to a position away from the paper bundle 21 during processing of cutting the wrapping paper 22 (wrapping paper cutting processing).

A conveyance unit 57 is arranged on the downstream side in the paper conveyance direction of the pickup roller 52. The conveyance unit 57 includes small and large conveyance rollers that are provided in the middle of an insertion guide unit (not illustrated) into which paper P is inserted and that convey the paper P to the downstream side in the paper conveyance direction, a motor (not illustrated) as a driving source that rotates and drives the conveyance rollers, a paper detecting unit (not illustrated) that is an optical or contact-type sensor that detects reaching of a leading end part of the paper P and passing of a rear end part of the paper P in the insertion guide unit, and the like.

Here, as illustrated in FIGS. 3A to 3F, the paper feeding unit 50 houses a wrapped body 20 in a state in which a paper bundle 21 in which a plurality of pieces of rectangular paper P is laminated is wrapped in wrapping paper 22.

The wrapping paper 22 wraps the paper bundle 21 in a manner of being rolled up therearound, and has a first folded piece 221 that is formed by an extended part 227, which is extended beyond the paper bundle 21 in a direction orthogonal to a rolled-up direction, being folded from a side of an upper surface 211 of the paper bundle 21 toward a first end surface 213 of the paper bundle 21, and a second folded piece 222 formed by the extended part 227 being folded from a side of a lower surface 212 of the paper bundle 21 toward the first end surface 213.

In the following, a detailed example of how a paper bundle 21 is wrapped in wrapping paper 22 will be described with reference to FIGS. 3A to 3F.

Figure 3A:
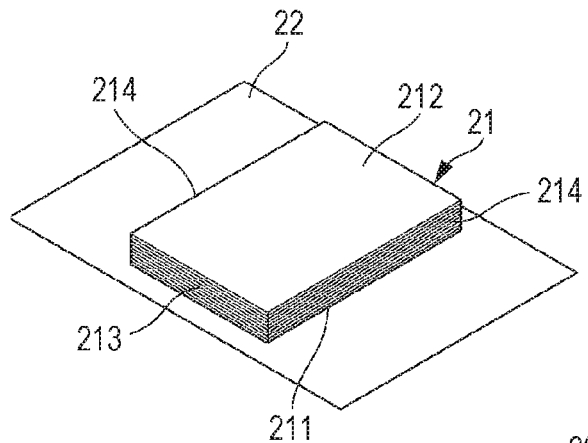
FIGS. 3A to 3F are schematic views for describing how a wrapped body is wrapped.
Figure 3B:
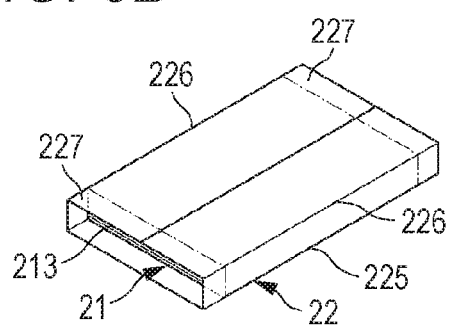
Figure 3C:
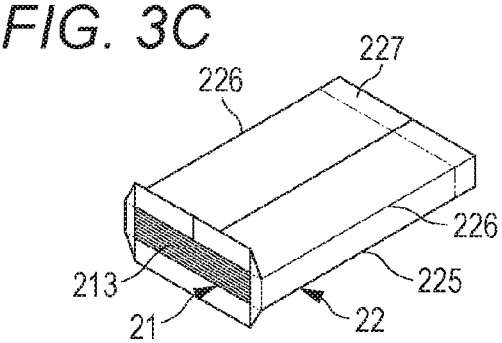
Figure 3D:
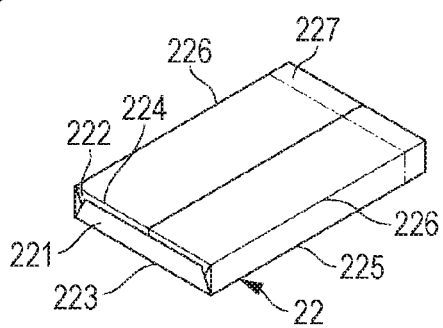
Figure 3E:
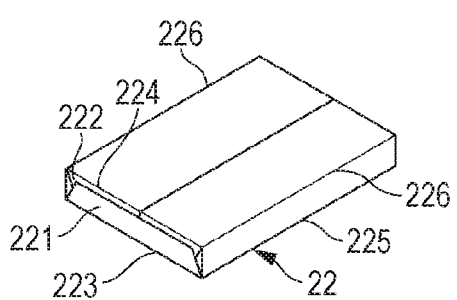
Figure 3F:
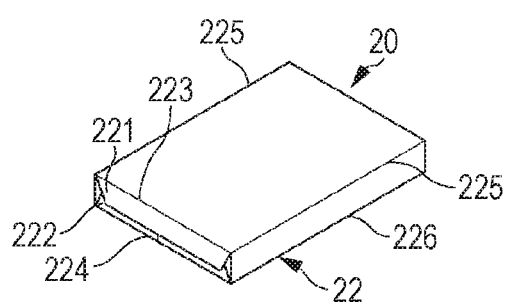

First, as illustrated in FIG. 3A, the paper bundle 21 is placed on the wrapping paper 22 in a reversed direction in such a manner that an upper surface 211 is in contact with the wrapping paper 22. As illustrated in FIG. 3B, the paper bundle 21 placed in such a manner is wrapped in such a manner that the wrapping paper 22 are rolled up around four surfaces that are the upper surface 211, a lower surface 212, and opposing two second end surfaces 214. Accordingly, in the wrapping paper 22, two third crease parts 225 along corner parts between the two second end surfaces 214, which are adjacent to the first end surface 213 of the paper bundle 21, and the upper surface 211 are formed, and two fourth crease parts 226 along corner parts between the two second end surfaces 214 and the lower surface 212 are formed. In this state, both edge parts superimposed in a rolled-up direction of the wrapping paper 22 are adhered to each other. Then, as illustrated in FIG. 3C, the extended part 227 of the wrapping paper 22 is folded from a side of each of the two second end surfaces 214 toward the first end surface 213. Subsequently, as illustrated in FIG. 3D, the extended part 227 is folded at a second crease part 224 from a side of the lower surface 212 toward the first end surface 213 and a second folded piece 222 is formed, and the extended part 227 is folded at a first crease part 223 from a side of the upper surface 211 toward the first end surface 213 and a first folded piece 221 is formed. In this state, the first folded piece 221 and the second folded piece 222 are adhered to each other. Finally, after an extended part 227 of the wrapping paper 22 is folded in a similar manner on an end surface on an opposite side opposing the first end surface 213 of the paper bundle 21 as illustrated in FIG. 3E, the whole part is revered as illustrated in FIG. 3F, whereby a wrapped body 20 is formed. The wrapped body 20 formed in such a manner is housed in the paper housing 51 in a direction illustrated in FIG. 3F.

Note that as a detailed configuration of exposing a paper bundle 21 by removing wrapping paper 22 of a wrapped body 20 housed in the paper housing 51, and of feeding paper P by one sheet in image forming in the paper feeding device 500, a known technology such as that in JP 2016-159998 A can be arbitrarily used.

Figure 4:
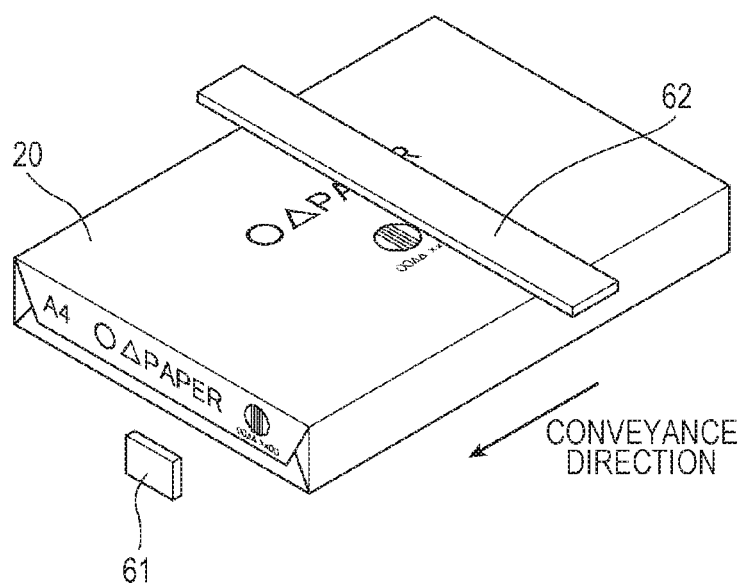
FIG. 4 is a view illustrating an example of a sensor arrangement with respect to a wrapped body housed in a paper housing.

As illustrated in FIG. 4, the sensor (reader) 61 is arranged in such a manner capable of scanning a side of a side surface on a front side in the conveyance direction of the wrapped body 20 housed in the paper housing 51 (hereinafter, referred to as front side surface). The sensor 61 scans the front side surface of the wrapped body 20 housed in the paper housing 51 and acquires an image on a front side surface of the wrapping paper 22. Here, the image on the front side surface of the wrapping paper 22 is an image on the wrapping paper 22 placed on the front side surface of the wrapped body 20.

As illustrated in FIG. 4, the sensor (reader) 62 is arranged in such a manner capable of scanning a side of an upper surface of the wrapped body 20 housed in the paper housing 51. The sensor 62 scans the upper surface of the wrapped body 20 housed in the paper housing 51 and acquires an image on an upper surface of the wrapping paper 22. Here, the image on the upper surface of the wrapping paper 22 is an image on the wrapping paper 22 placed on the upper surface of the wrapped body 20.

The controller 9 includes a CPU, a RAM, and the like. The CPU reads various processing programs stored in a storage device such as the storage 91, expands the programs in the RAM, and performs central control of an operation of each unit of the image forming device 100 according to the expanded programs.

The storage 91 stores a program that can be read by the controller 9, a file used in execution of the program, and the like. A large-capacity memory such as a hard disk can be used as the storage 91.

Also, the storage 91 stores images on a front side surface and an upper surface of each kind of wrapping paper 22. Also, the storage 91 stores a table T1 indicating a relationship between wrapping paper 22 and a conveyance condition (see FIG. 7), and a table T2 indicating a relationship between wrapping paper 22 and a process condition (see FIG. 8).

The operation unit 92 includes various operation keys such as a numeric keypad and a start key, receives an operation input from a user, and outputs an operation signal corresponding to the operation input to the controller 9. Note that the operation unit 92 may be, for example, a touch panel formed integrally with the display 93.

The display 93 displays various operation screens, a state of an image, an operation condition of each function, and the like according to a display control signal input from the controller 9.

Next, an operation of the image forming device 100 according to the present embodiment will be described with reference to FIGS. 5 to 8.

Figure 5:
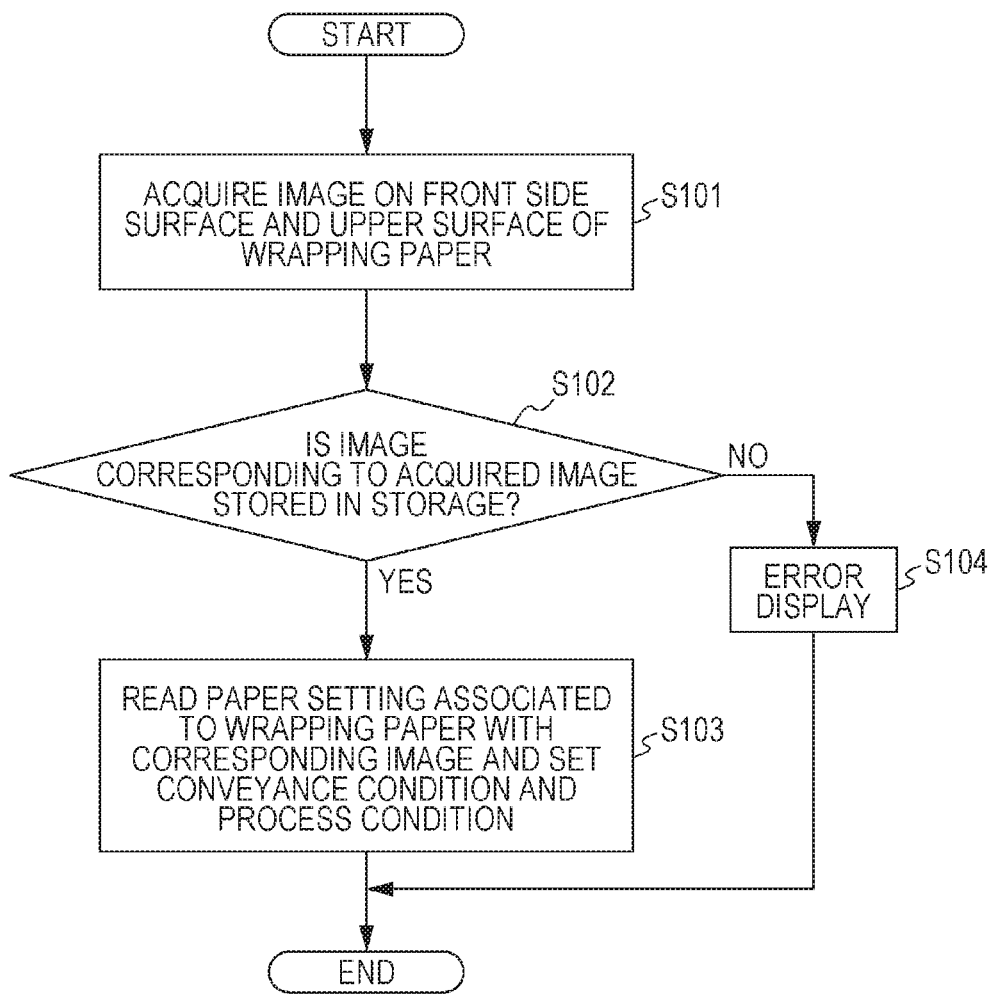
FIG. 5 is a flowchart illustrating an operation of the image forming device according to the present embodiment.
Figure 6A:
FIGS. 6A and 6B are views illustrating an example of images on a front side surface and an upper surface of wrapping paper.
Figure 6B:

First, as illustrated in a flowchart in FIG. 5, the controller 9 makes the sensor 61 and the sensor 62 respectively acquire images on the front side surface and the upper surface of the wrapping paper 22 (step S101). An example of an image on the front side surface of the wrapping paper 22 is illustrated in FIG. 6A, and an example of an image on the upper surface of the wrapping paper 22 is illustrated in FIG. 6B.

Next, the controller 9 compares the images on the front side surface and the upper surface of the wrapping paper 22, the images being acquired in step S101, and images on a front side surface and an upper surface of wrapping paper 22, the images being stored in the storage 91, and determines whether images corresponding to the images acquired in step S101 are stored in the storage 91 (step S102). For example, the controller 9 determines whether images corresponding to the images acquired in step S101 are stored in the storage 91 by extracting and comparing outlines of both of the images acquired in step S101 and the images stored in the storage 91. Also, for example, the controller 9 determines whether images corresponding to the images acquired in step S101 are stored in the storage 91 by recognizing characters, by optical character recognition (OCR), from both of the images acquired in step S101 and the images stored in the storage 91 and performing comparison therebetween.

In a case of determining that images corresponding to the images acquired in step S101 are stored in the storage 91 (step S102: YES), the controller 9 transitions to step S103.

On the other hand, in a case of determining that images corresponding to the images acquired in step S101 are not stored in the storage 91 (step S102: NO), the controller 9 makes the display 93 perform an error display indicating that there is an error in reading of the wrapping paper 22 (step S104), and ends the processing. In this case, a conveyance condition and a process condition may be set on the basis of default paper setting or the display 93 may be made to display guidance prompting a user to perform paper setting.

Next, the controller 9 reads paper setting associated to the wrapping paper 22 determined to have the corresponding images in step S102, and sets a conveyance condition and a process condition based on the paper setting (step S103). Here, the conveyance condition is, for example, a conveyance speed, a pressure of a decurler (decurler pressure), and a conveyance path. Also, the process condition is, for example, a transfer voltage, a pressure of the fixing unit 7 (fixing pressure), and a fixing temperature.

In step S103, the controller 9 refers to the table T1 and the table T2 previously stored in the storage 91, reads paper setting associated to the wrapping paper 22, and sets a conveyance condition and a process condition.

Figure 7:
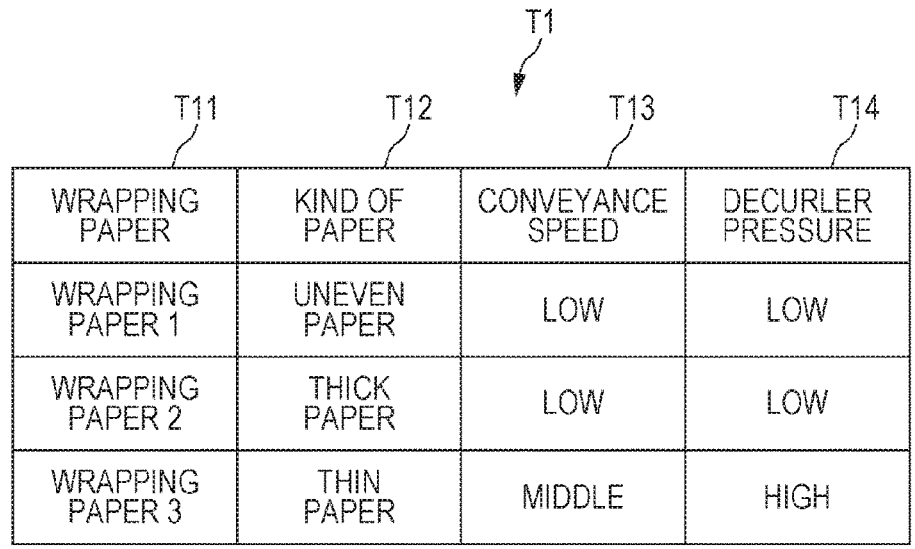
FIG. 7 is a table illustrating an example of a table indicating a relationship between wrapping paper and a conveyance condition.

An example of the table T1 indicating a relationship between wrapping paper 22 and a conveyance condition is illustrated in FIG. 7.

As illustrated in FIG. 7, the table T1 has fields of wrapping paper T11 indicating wrapping paper 22, a kind of paper T12 indicating a kind of paper wrapped in the wrapping paper 22, a conveyance speed T13, and a decurler pressure T14. In the present embodiment, each of the conveyance speed T13 and the decurler pressure T14 is set in three stages of "high," "middle," and "low."

For example, it is possible to read from a first record of the table T1 that the kind of paper T12 is "uneven paper," the conveyance speed T13 is "low," and the decurler pressure T14 is "low" in a case where the wrapping paper T11 is "wrapping paper 1." Also, it is possible to read that the kind of paper T12 is "thick paper," the conveyance speed T13 is "low," and the decurler pressure T14 is "low" in a case where the wrapping paper T11 is "wrapping paper 2." Also, it is possible to read that the kind of paper T12 is "thin paper," the conveyance speed T13 is "middle," and the decurler pressure T14 is "high" in a case where the wrapping paper T11 is "wrapping paper 3."

Figure 8:
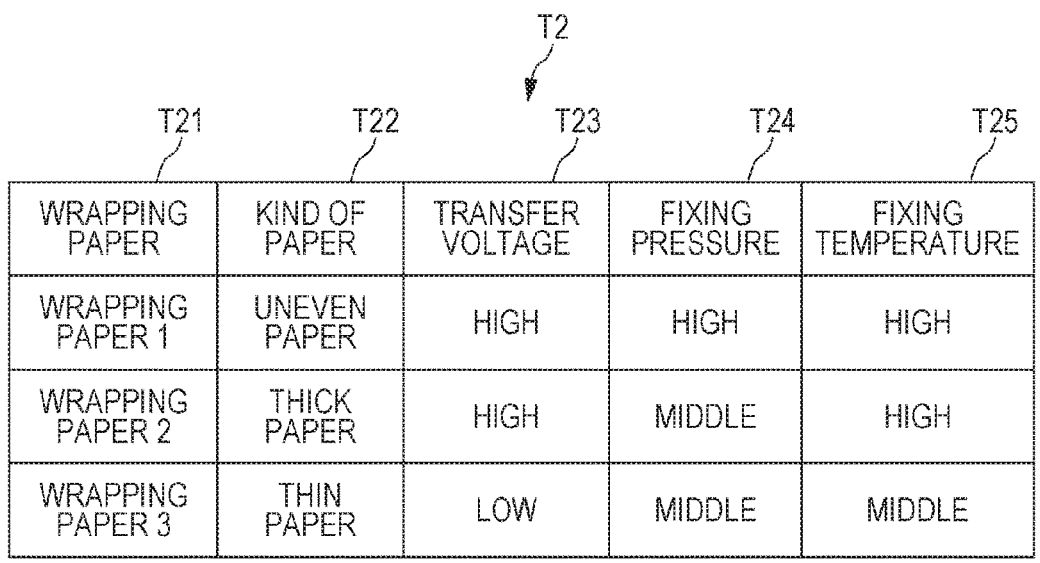
FIG. 8 is a table illustrating an example of a table indicating a relationship between wrapping paper and a process condition.

An example of the table T2 indicating a relationship between wrapping paper 22 and a process condition is illustrated in FIG. 8.

As illustrated in FIG. 8, the table T2 has fields of wrapping paper T21 indicating wrapping paper 22, a kind of paper T22 indicating a kind of paper wrapped in the wrapping paper 22, a transfer voltage T23, a fixing pressure T24, and a fixing temperature T25. In the present embodiment, each of the transfer voltage T23, the fixing pressure T24, and the fixing temperature T25 is set in three stages of "high," "middle," and "low."

For example, it is possible to read from a first record of the table T2 that the kind of paper T22 is "uneven paper," the transfer voltage T23 is "high," the fixing pressure T24 is "high," and the fixing temperature T25 is "high" in a case where the wrapping paper T21 is "wrapping paper 1." Also, it is possible to read that the kind of paper T22 is "thick paper," the transfer voltage T23 is "high," the fixing pressure T24 is "middle," and the fixing temperature T25 is "high" in a case where the wrapping paper T21 is "wrapping paper 2." Also, it is possible to read that the kind of paper T22 is "thin paper," the transfer voltage T23 is "low," the fixing pressure T24 is "middle," and the fixing temperature T25 is "middle" in a case where the wrapping paper T21 is "wrapping paper 3."

Then, the controller 9 controls the paper feeding device 500 to expose a paper bundle 21 by removing wrapping paper 22 of a wrapped body 20 housed in the paper housing 51 and to feed paper P by one sheet in image forming. Accordingly, it becomes possible to form an image in a conveyance condition and a process condition suitable for the paper P.

As described above, the image forming device 100 according to the present embodiment includes a reader (sensor 61 and 62) that reads an image on wrapping paper 22, and the controller 9 that compares the image on the wrapping paper 22, the image being read by the reader, and images on various kinds of wrapping paper, the images being stored in the storage 91, that reads, from the storage 91, paper setting associated to wrapping paper 22 corresponding to the image on the wrapping paper 22, the image being read by the reader, and that sets a conveyance condition and a process condition based on the paper setting.

Thus, according to the image forming device 100 of the present embodiment, it is possible to determine a pattern or a design of wrapping paper 22 and to identify a kind of paper. Thus, it is possible to set a conveyance condition and a process condition suitable for the paper without making a change on the wrapping paper and regardless of a set direction of a paper bundle.

Specifically, according to the image forming device 100 of the present embodiment, the reader reads at least one of a front side surface and an upper surface of wrapping paper 22, and the controller 9 compares an image on at least one of the front side surface and the upper surface of the wrapping paper 22, the surface being read by the reader, and an image on at least one of a front side surface and an upper surface of each of various kinds of wrapping paper 22 which image is stored in the storage 91.

Thus, according to the image forming device 100 of the present embodiment, it is possible to read an image on a front side surface or an upper surface of wrapping paper 22 on which surface a pattern or a design is likely to be formed, whereby it is possible to more securely identify a kind of paper and to set a conveyance condition and a process condition suitable for the paper.

In the above, the description is made in detail on the basis of an embodiment according to the present invention. However, the present invention is not limited to the above embodiment and can be modified within the spirit and the scope thereof.

Modification Example

For example, the present invention may be applied to an image forming system 200 including a cloud server 120 provided in a cloud, and a plurality of image forming devices 110.

Figure 9:
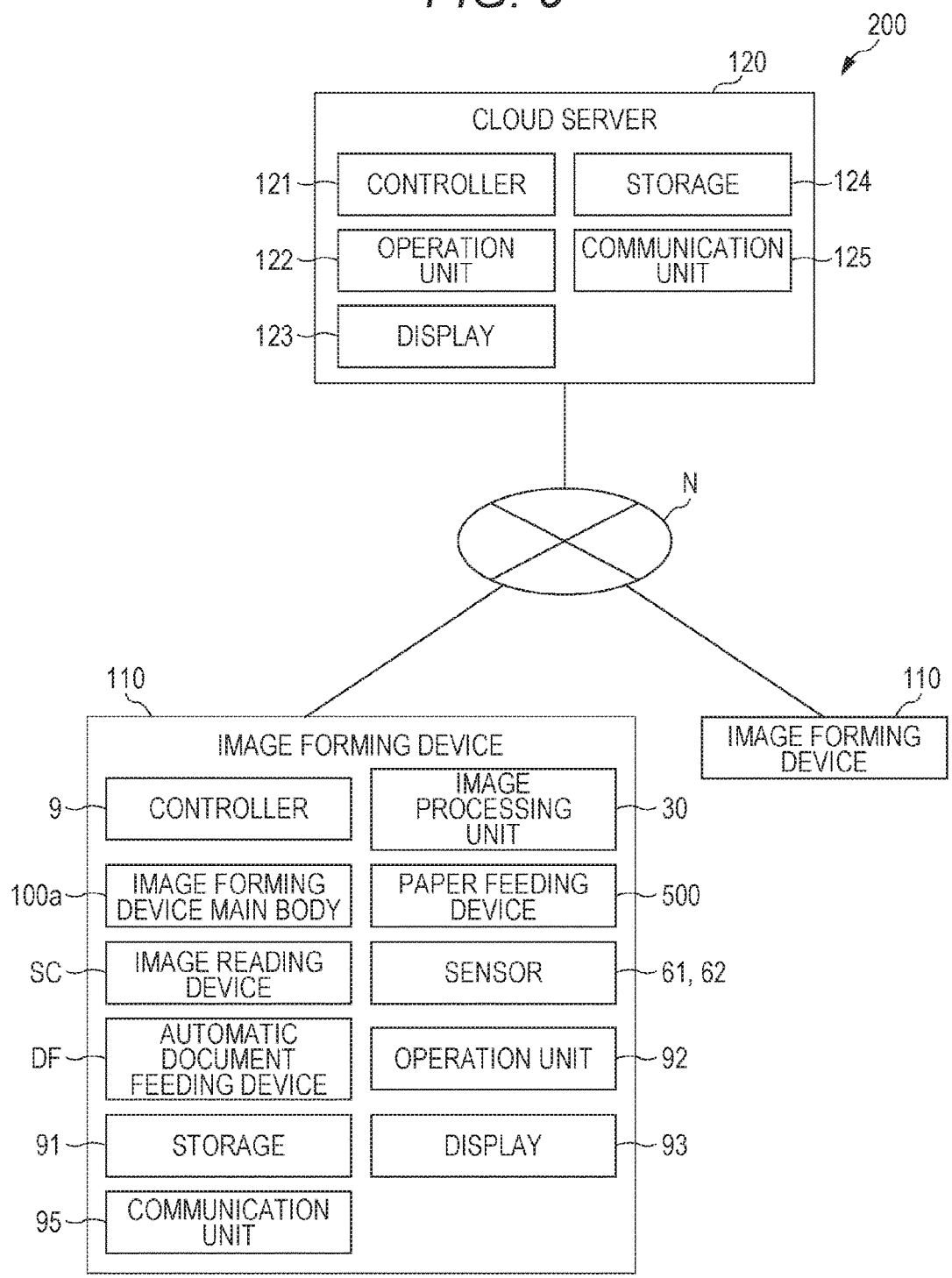
FIG. 9 is a block diagram illustrating a main control configuration of each device included in an image forming system according to a modification example.

As illustrated in FIG. 9, the image forming system 200 includes a cloud server (server device) 120, and a plurality of image forming devices 110. The cloud server 120 and the plurality of image forming devices 110 can be connected to each other via a communication network N. More specifically, for example, the communication network N is the Internet, or a telephone network or a mobile phone communication network of a telecommunications carrier or the like.

The cloud server 120 includes a controller 121, an operation unit 122, a display 123, a storage 124, and a communication unit 125.

The controller 121 performs central control of an operation of the cloud server 120. More specifically, the controller 121 includes a CPU, a ROM, a RAM, and the like and integrally controls units of the cloud server 120 by program data, which is stored in the ROM expanded in a work area of the RAM or is stored in the storage 124, and the CPU in cooperation.

The operation unit 122 includes, for example, a keyboard including a character input key, a numeric number input key, keys associated to various different functions, and the like and a pointing device such as a mouse, receives an operation input from a user, and outputs an operation signal corresponding to the operation input to the controller 121. Note that the operation unit 122 may be, for example, a touch panel formed integrally with the display 123, or the like.

The display 123 includes, for example, a display such as a liquid crystal display (LCD) and displays, onto a display screen, an image based on a display control signal output from the controller 121.

The storage 124 includes, for example, a hard disk drive (HDD) or a semiconductor memory, and stores data such as program data or various kind of setting data in a manner that can be read/written by the controller 121.

Also, the storage 124 stores images on a front side surface and an upper surface of each kind of wrapping paper 22. Also, the storage 124 stores a table T1 indicating a relationship between wrapping paper 22 and a conveyance condition (see FIG. 7), and a table T2 indicating a relationship between wrapping paper 22 and a process condition (see FIG. 8). An image on each kind of wrapping paper 22, and various tables are not registered (stored) by a user but by a person in charge in a manufacturer of the image forming device 110 Information is sequentially updated each time a new product is released.

The communication unit 125 is a communication interface including an integrated circuit (IC) for communication, a communication connector, and the like and performs data communication via a communication network N by using a predetermined communication protocol under control by the controller 121.

An image forming device 110 of the modification example is different from an image forming device 100 of an embodiment in a point that images on a front side surface and an upper surface of each kind of wrapping paper 22, a table T1, and a table T2 are not stored in a storage 91 and that a communication unit 95 to communicate with a cloud server 120 is included.

The communication unit 95 of the image forming device 110 is a communication interface including an integrated circuit (IC) for communication, a communication connector, and the like and performs data communication via a communication network N by using a predetermined communication protocol under control by a controller 9.

As described above, the server device (cloud server 120) of the image forming system 200 according to the modification example includes the storage 124 that stores an image on each kind of wrapping paper, and paper setting associated to each kind of wrapping paper.

Thus, according to the image forming system 200 of the modification example, operation of registering an image on each kind of wrapping paper 22, and various tables can be performed by a manufacturer of the image forming device 110, whereby a usage burden on a user can be decreased.

Also, the image forming system 200 according to the modification example includes a plurality of image forming devices 110. A controller 9 of each of the plurality of image forming devices 110 reads, from the storage 124, paper setting associated to wrapping paper 22 corresponding to an image on wrapping paper 22, the image being read by a reader, and sets a conveyance condition and a process condition based on the paper setting.

Thus, according to the image forming system 200 of the modification example, it is possible for a manufacturer of the image forming devices 110 to integrally manage the image forming devices 110 and to collect and use, for later operation, a usage condition of paper by each user.

Also, according to the image forming system 200 of the modification example, a server device is provided in a cloud.

Thus, according to the image forming system 200 of the modification example, it is possible to easily share information between a manufacturer of the image forming devices 110 and a user, and to realize a more optimized service.

(Different Modification Example)

Also, in a case where it is not possible to acquire images on a front side surface and an upper surface of wrapping paper 22 with a sensor 61 and a sensor 62 in step S101, guidance to instruct a user to reload a wrapped body 20 into a paper housing 51 may be displayed on a display 93.

As described above, in a case where a reader cannot read an image on wrapping paper 22, guidance to instruct a user to reload a wrapped body 20 into a paper housing 51 is displayed on a display 93, whereby it becomes possible to deal with an error in loading of the wrapped body 20 and to control a delay in paper conveyance, or paper conveyance in an inappropriate condition.

Also, in a case where a sensor 61 and a sensor 62 cannot acquire images on a front side surface and an upper surface of wrapping paper 22 in step S101, a conveyance condition and a process condition may be set on the basis of default paper setting. Also, guidance prompting a user to perform paper setting may be displayed on a display 93.

As described above, in a case where a reader cannot read an image on wrapping paper 22, a conveyance condition and a process condition are set on the basis of default paper setting or guidance prompting a user to perform paper setting is displayed on a display 93, whereby it is possible to securely set a conveyance condition and a process condition and to control a delay in paper conveyance.

Also, a paper size may be determined on the basis of sizes of images on a front side surface and an upper surface of wrapping paper 22 which images are acquired in step S101.

As described above, a paper size is determined on the basis of a size of an image on wrapping paper 22 which image is read by a reader, whereby not only a kind of paper but also information of a paper size can be read and a conveyance condition and a process condition more suitable for paper can be set.

Also, in a case where an error such as a paper jam is generated in conveyance of paper in a conveyance condition and a process condition set in step S103, information of the error and paper setting according to the set conveyance condition and process condition may be associated to each other and stored in a storage 91 (storage 124 in case of modification example).

As described above, in a case where an error is generated in conveyance of paper, information of the error and paper setting according to the set conveyance condition and process condition are associated to each other and stored in the storage 91, whereby it is possible for a manufacturer of an image forming device 110 to acquire information such as which kind of paper is likely to cause a trouble, and to correct setting of a conveyance condition and a process condition into more appropriate one.

Also, in a case where an image forming device has a plurality of conveyance paths, a conveyance path may be set as one of conveyance conditions in setting of a conveyance condition in step S103. In this case, wrapping paper 22 and a conveyance path are previously associated to each other in a table T1. For example, in a case where conveyed paper is thick paper, it is set that passing through a path with high curvature is not performed.

In addition, a detailed configuration of each of devices included in an image forming device and a detailed operation of each of the devices can be also modified arbitrarily within the spirit and the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device in which a wrapped body that is a paper bundle wrapped in wrapping paper is set into a paper housing, the wrapping paper is subsequently removed and the paper bundle is exposed, and paper is conveyed by one sheet in image forming, the image forming device comprising:
   a reader that reads an image on the wrapping paper; and
   a hardware processor that: compares the image on the wrapping paper, the image being read by the reader, and an image on each of various kinds of wrapping paper, the image being stored in a storage; reads, from the storage, paper setting associated to wrapping paper corresponding to the image on the wrapping paper, the image being read by the reader; and sets a conveyance condition and a process condition based on the paper setting, the image forming device conveying and processing the sheet to form an image thereon based on the proper setting,
   wherein
   the reader reads images on one side surface and the other side surface that is different from the one side surface, and
   the controller compares each of the images read by the reader with the image of each kind of wrapping paper stored in the storage to identify a corresponding image.

2. The image forming device according to claim 1, wherein the reader reads at least one of a front side surface and an upper surface of the wrapping paper, and
the hardware processor compares an image on at least one of the front side surface and the upper surface of the wrapping paper, the surface being read by the reader, and an image on at least one of a front side surface and an upper surface of each of various kinds of wrapping paper, the image being stored in the storage.

3. The image forming device according to claim 1, wherein in a case where the image on the wrapping paper cannot be read by the reader, the hardware processor causes a display to display guidance instructing a user to reload the wrapped body into the paper housing.

4. The image forming device according to claim 1, wherein in a case where the image on the wrapping paper cannot be read by the reader, the hardware processor sets a conveyance condition and a process condition on the basis of default paper setting, or causes a display to display guidance prompting a user to perform paper setting.

5. The image forming device according to claim 1, wherein the hardware processor determines a paper size on the basis of a size of the image on the wrapping paper which image is read by the reader.

6. The image forming device according to claim 1, wherein in a case where an error is generated in conveyance of paper, the hardware processor causes information of the error and paper setting according to the set conveyance condition and process condition to be associated to each other and stored in the storage.

7. An image forming system comprising:
the image forming device according to claim 1; and
a server device connected to the image forming device,
wherein the server device includes a storage that stores an image on each of various kinds of wrapping paper, and paper setting associated to the various kinds of wrapping paper.

8. The image forming system according to claim 7, further comprising
a plurality of the image forming devices,
wherein the hardware processor of each of the plurality of image forming devices reads, from the storage, paper setting associated to wrapping paper corresponding to the image on the wrapping paper, the image being read by the reader, and sets a conveyance condition and a process condition based on the paper setting.

9. The image forming system according to claim 7, wherein the server device is provided in a cloud.

* * * * *